US006978025B1

(12) United States Patent
Price, III

(10) Patent No.: US 6,978,025 B1
(45) Date of Patent: Dec. 20, 2005

(54) METHOD AND APPARATUS FOR MANAGING PUBLIC KEYS THROUGH A SERVER

(75) Inventor: William F. Price, III, Los Altos, CA (US)

(73) Assignee: PGP Corporation, Palo Alto, CA (US)

( * ) Notice: Subject to any disclaimer, the term of this patent is extended or adjusted under 35 U.S.C. 154(b) by 791 days.

(21) Appl. No.: 09/724,337

(22) Filed: Nov. 27, 2000

Related U.S. Application Data

(60) Provisional application No. 60/230,235, filed on Sep. 1, 2000.

(51) Int. Cl.[7] ............................ H04L 9/00; H04K 1/00; G06F 11/30; G06F 15/173; G06F 15/16
(52) U.S. Cl. ...................... 380/282; 380/277; 380/278; 380/279; 380/285; 713/155; 713/156; 713/157; 713/158; 713/170; 713/171; 713/175; 713/185; 713/200; 713/201; 709/223; 709/224; 709/225; 709/226; 709/229
(58) Field of Search ............................... 713/155–158, 713/173, 175, 182, 200–202, 170–171, 185; 380/277–279, 380/286, 282, 285; 709/223–226, 229

(56) References Cited

U.S. PATENT DOCUMENTS

| 6,044,462 | A  | * | 3/2000  | Zubeldia et al. ............. 713/158 |
| 6,134,551 | A  | * | 10/2000 | Aucsmith ..................... 707/10 |
| 6,233,685 | B1 | * | 5/2001  | Smith et al. ................. 713/194 |
| 6,260,142 | B1 | * | 7/2001  | Thakkar et al. ............. 713/158 |
| 6,314,190 | B1 | * | 11/2001 | Zimmermann .............. 380/282 |
| 6,317,829 | B1 | * | 11/2001 | Van Oorschot ............. 713/155 |
| 6,336,186 | B1 | * | 1/2002  | Dyksterhouse et al. ..... 713/156 |
| 6,370,249 | B1 | * | 4/2002  | Van Oorschot ............. 380/277 |
| 6,567,914 | B1 | * | 5/2003  | Just et al. ................... 713/160 |
| 6,662,299 | B1 | * | 12/2003 | Price, III ..................... 713/171 |
| 6,751,735 | B1 | * | 6/2004  | Schell et al. ................ 713/189 |
| 6,760,752 | B1 | * | 7/2004  | Liu et al. .................... 709/206 |
| 6,851,053 | B1 | * | 2/2005  | Liles et al. .................. 713/168 |
| 6,886,096 | B2 | * | 4/2005  | Appenzeller et al. ....... 713/170 |

OTHER PUBLICATIONS

Karve, Mar. 1999, Network Magazine, vol. 14, iss. 3, p. 30.*
M2 Presswire, Mar. 19, 1998, Coventry, p. 1.*
Kobielus, Mar. 26, 1997, Network World, vol. 14, iss. 21, pg. 43.*
Borck, Sep. 13, 1999, InfoWorld, 21, 37, 39.*
The Cornell Key Signer, http:// www. cit. cornell. edu.*
Price, May 2003, p. 1-10.*
Kessler, Aug. 1997, Network Var, v5, n8, p. 65.*
Frisch, Feb. 1997, RS Magazine, p. 16-20.*
Eastlake et al., Domain Name System(DNS) Security Key Rollover, p. 1-9, Oct. 1998.*

* cited by examiner

*Primary Examiner*—Ayaz Sheikh
*Assistant Examiner*—Jenise Jackson
(74) *Attorney, Agent, or Firm*—Cooley Godward LLP

(57) ABSTRACT

One embodiment of the present invention provides a system for managing public keys through a server that stores associations between public keys and email addresses. This system operates by receiving a first message from a client containing a request for approval of a client public key along with the client public key. In response this request for approval, the system sends a second message to the client containing a request for identity confirmation that includes the client public key. If a third message is received from the client containing an affirmative response to the request for identity confirmation, the system stores an association between a client email address and the client public key in a database. This allows other clients to look up the client public key in the database.

24 Claims, 5 Drawing Sheets

METHOD AND APPARATUS FOR MANAGING PUBLIC KEYS THROUGH A SERVER

RELATED APPLICATION

The application hereby claims priority under 35 U.S.C. § 119 to Provisional Patent Application No. 60/230,235 filed on Sep. 1, 2000.

The subject matter of this application is related to the subject matter in a co-pending non-provisional application by the same inventor as the instant application and filed on the same day as the instant application entitled, "Method and Apparatus for Periodically Removing Invalid Public Keys from a Public Key Server," having Ser. No. 09/724,349, and filing date Nov. 27, 2000.

BACKGROUND

1. Field of the Invention

The present invention relates to the field of computer security. More specifically, the present invention relates to a method and an apparatus for managing public keys by using a server that stores associations between public keys and email addresses.

2. Related Art

The advent of computer networks has led to an explosion in the development of applications that facilitate rapid dissemination of information. In particular, electronic mail (email) is becoming the predominant method for communicating textual and other non-voice information. Using email, it is just as easy to send a message to a recipient on another continent as it is to send a message to a recipient within the same building. Furthermore, an email message typically takes only minutes to arrive, instead of the days it takes for conventional mail to snake its way along roads and through airports.

One problem with email is that it is hard to ensure that sensitive information sent through email is kept confidential. This is because an email message can potentially traverse many different computer networks and many different computer systems before it arrives at its ultimate destination. An adversary can potentially intercept an email message at any of these intermediate points along the way.

One way to remedy this problem is to "encrypt" sensitive data using an encryption key so that only someone who possesses a corresponding decryption key can decrypt the message. (Note that for commonly used symmetric encryption mechanisms the encryption key and the decryption key are the same key.) A person sending sensitive data through email can encrypt the sensitive data using the encryption key before it is sent through email. At the other end, the recipient of the email can use the corresponding decryption key to decrypt the sensitive information.

Managing encryption keys for the millions of users who can potentially send encrypted email message is a challenging task. Some existing key management systems operate by enrolling public keys for users with an "identity authority." An identity authority typically operates by verifying the identities of owners of public keys as well as keeping track of revoked public keys.

However, existing systems have a number of shortcomings. The verification process is often cumbersome. It typically involves some type of manual check, such as making a telephone call, taking a fingerprint, or receiving personal information from an owner of a public key. Although such manual checks provide a measure of security, they are time-consuming and can be impractical to perform for a large number of users.

Another shortcoming is that the key revocation process does not work well. Some existing systems make use of a "certificate revocation list" (CRL), which contains a listing of revoked certificates. Before using a public key, a client typically checks a locally stored copy of a CRL to verify that the public key has not been revoked. However, a locally stored copy of a CRL may be updated only occasionally (for example, once a week), which means the locally stored copy of the CRL may not be current. This can create problems. For example, an employee who leaves a company may continue to receive sensitive encrypted email messages until the locally stored copy of the CRL is updated.

Furthermore, a CRL can grow very large over time as more and more certificates are revoked. In some cases, a CRL can contain millions of entries! Hence, a locally stored copy of a CRL can require a large amount space to store, and can be cumbersome to update.

What is needed is a method and apparatus for managing encryption keys that does not require a time-consuming manual check during the verification process, and that does not suffer from the shortcomings of using a CRL to keep track of revoked keys.

SUMMARY

One embodiment of the present invention provides a system for managing public keys through a server that stores associations between public keys and email addresses. This system operates by receiving a first message from a client containing a request for approval of a client public key along with the client public key. In response this request for approval, the system sends a second message to the client containing a request for identity confirmation that includes the client public key. If a third message is received from the client containing an affirmative response to the request for identity confirmation, the system stores an association between a client email address and the client public key in a database. This allows other clients to look up the client public key in the database.

In one embodiment of the present invention, the system additionally receives a communication from a second client that includes the client email address. In response to this communication, the system performs a lookup in the database based on the client email address to determine if the client email address is associated with the client public key. If the lookup indicates that the client email address is associated with the client public key, the system sends a key identifier for the client public key from the server to the client. This key identifier allows the client to determine whether the client possesses the client public key.

In one embodiment of the present invention, the request for approval includes key reconstitution information that allows the client to decrypt to an encrypted client private key at the client if the client forgets a passphrase for decrypting the encrypted client private key. This key reconstitution information is stored in the database at the server. Note that a "passphrase" is a generalization of a password that can potentially contain an entire phrase instead of a single password.

In one embodiment of the present invention, the system decrypts the request for approval using a server private key, and then uses the client public key to verify that the request for approval is signed by a corresponding client private key.

In one embodiment of the present invention, prior to sending the second message, the system determines if the database already contains a prior client public key associated with the client email address. If so, the system includes the prior client public key in the request for identity confirmation sent to the client. This enables the client to subsequently indicate that the server should replace the prior client public key with the client public key.

In one embodiment of the present invention, the system additionally receives a request at the server to remove the client public key from the database. If this request is signed with a corresponding client private key, the system removes the client public key from the database.

In one embodiment of the present invention, the database contains at most one key for each email address.

In one embodiment of the present invention, the database contains at most one email address for each key.

In one embodiment of the present invention, the system periodically sends a verification request from the server to the client email address asking if the client public key remains valid. If an affirmative response to the verification request is not received, the system removes the client public key from the database.

One embodiment of the present invention provides a system for managing public keys through a server that stores associations between public keys and email addresses. This system operates by receiving a client public key from a client, and then storing the client public key in a database at the server. The system then allows other clients to lookup the client public key in the database. The system also periodically sends a verification request from the server to the client asking if the client public key remains valid. If an affirmative response to the verification request is not received, the system removes the client public key from the database.

In one embodiment of the present invention, the system stores the client public key in the database by signing the client public key using a server private key, and then storing the signed client public key in the database.

In one embodiment of the present invention, the client public key is removed from the database only if an affirmative response is not received after sending multiple verification requests at different times.

Note that the present invention facilitates automated identity confirmation without requiring a time-consuming manual check during the verification process. Furthermore, the present invention does not rely on locally stored key management information, which can potentially be outdated, and does not suffer from having to maintain a lengthy revocation list.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Networked Computer System

Figure 1:
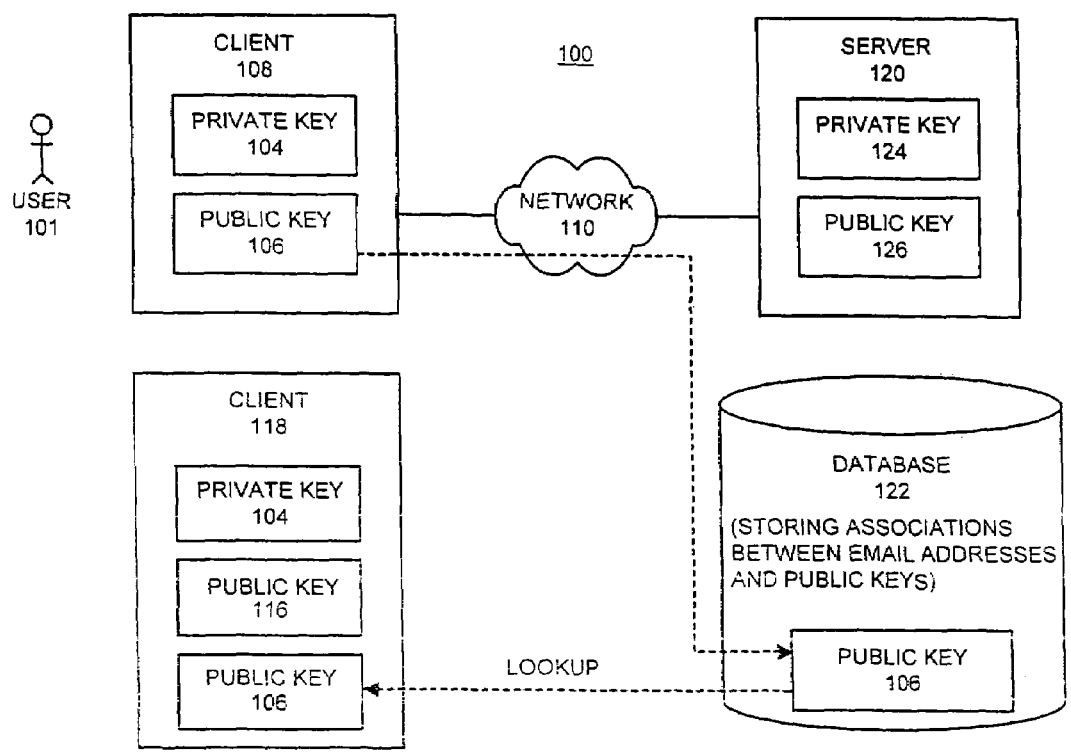
FIG. 1 illustrates a distributed computer system in accordance with an embodiment of the present invention.

FIG. 1 illustrates a networked computer system 100 in accordance with an embodiment of the present invention. Networked computer system 100 includes clients 108 and 118, which are coupled to server 120 through network 110. Clients 108 and 118 can generally include any type of computer system, including, but not limited to, a computer system based upon a microprocessor, a mainframe processor, a device controller, and a computational engine within an appliance. In the embodiment illustrated in FIG. 1, client 108 contains private key 104 and public key 106, which collectively form a private key-public key pair in such a way that a message to be encrypted using public key 106 and decrypted using private key 104. Note that private key 104 cannot be deduced from public key 106 in a tractable amount of computational time. Similarly, client 118 contains private key 114 and public key 116, and server 120 includes private key 124 and public key 126.

Network 110 can include any type of wire or wireless communication channel capable of coupling together client 108, client 118 and server 120. This includes, but is not limited to, a local area network, a wide area network, or a combination of networks. In one embodiment of the present invention, network 110 includes the Internet.

Server 120 can include any node on a computer network including a mechanism for servicing requests from clients 108 and 118 for computational and/or data storage resources. In the embodiment of the present invention illustrated in FIG. 1, server 120 processes requests to enroll keys in database 122 and to lookup keys in database 122. Database 122 can include any type of storage system that is capable of storing data for server 120. In one embodiment of the present invention, database 122 stores associations between email addresses and public keys. Also note that in one embodiment of the present invention database 122 operates in conformance with the lightweight directory access protocol (LDAP).

Key Enrollment Process

Figure 2:
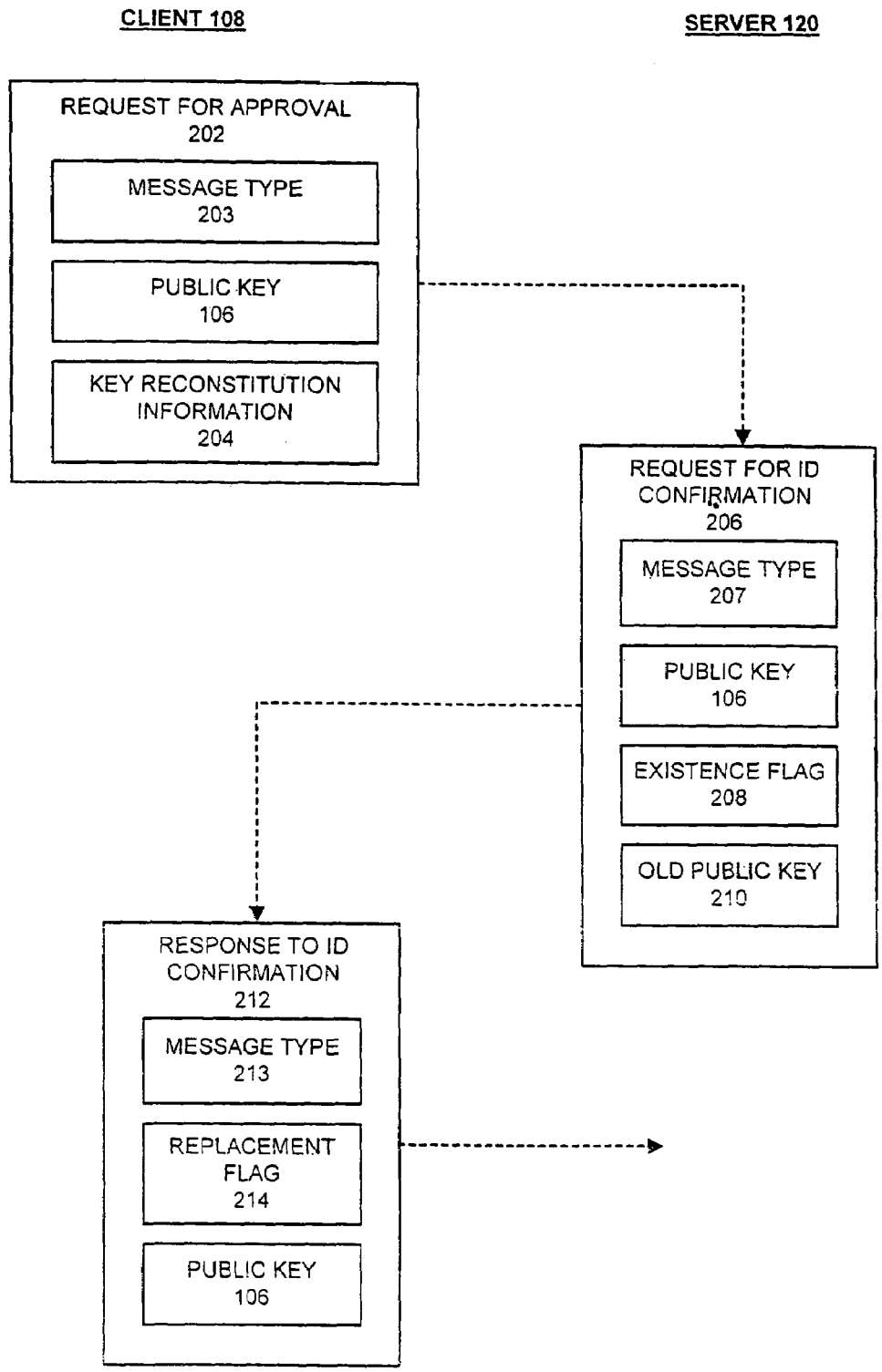
FIG. 2 illustrates messages sent during the key enrollment process in accordance with an embodiment of the present invention.

FIG. 2 illustrates messages sent between client 108 and server 120 during the key enrollment process in accordance with an embodiment of the present invention. In order to enroll a public key, client 108 sends a message to server 120 containing a request for approval 202. Request for approval 202 contains a message type field 203, which identifies the type of message. In this case, message type field 203 specifies that the message is a "request for approval." Request for approval 202 also includes a public key 106 belonging to client 108. Note that client 108 holds a corresponding private key 104.

Request for approval 202 optionally contains key reconstitution information 204, which can be used to decrypt private key 104 if user 101 forgets the passphrase that was used to encrypt private key 104. For example, this key reconstitution information 204 may allow user 101 to decrypt private key 104 by remembering answers to three of five questions, such as "what is your mother's maiden name?", or "what was your first dog's name?". This key reconstitution information is discussed in more detail in a pending U.S. patent application entitled, "Method and Apparatus for Reconstituting an Encryption Key Based on Multiple User Responses," by inventor William F. Price III, Ser. No. 09/429,217, filed Oct. 28, 1999. This application is hereby incorporated by reference to describe the key reconstitution process.

In one embodiment of the present invention, request for approval 202 is encrypted with public key 126 belonging to server 120, so that request for approval 202 can only be decrypted using corresponding private key 124, which is held by server 120. Request for approval 202 is also signed with private key 104 belonging to client 108. This enables server 120 to use corresponding public key 106 to verify that client 108 signed request for approval 202.

Upon receiving request for approval 202, server 120 sends a message to the email address of client 108. This message includes a request for ID confirmation 206. Request for ID confirmation 206 contains a message type field 207, which specifies that the message is a "request for ID confirmation." Request for ID confirmation 206 also contains public key 106, as well as existence flag 208 and possibly an old public key 210. If old public key 210 already exists for client 108 in database 122, server 120 sets existence flag 208 to TRUE, and includes old public key 210 in request for ID confirmation 206.

In one embodiment of the present invention, request for ID confirmation 206 is encrypted with public key 106 belonging to client 108, so that request for ID confirmation 206 can only be decrypted using corresponding private key 104, which is held by client 108. Request for ID confirmation 206 is also signed with private key 124 belonging to server 120. This enables client 108 to use corresponding public key 126 to verify that server 120 signed request for ID confirmation 206.

Upon receiving request for ID confirmation 206, client 108 sends a message to server 120, which includes response to ID confirmation 212. Response to ID confirmation 212 contains a message type field 213, which specifies that the message is a "response to ID confirmation." Response to ID confirmation 212 also includes replacement flag 214 and public key 106. Replacement flag 214 is set to TRUE if client 108 would like to replace old public key 210 with new public key 106.

In one embodiment of the present invention, response to ID confirmation 212 is encrypted with public key 126 belonging to server 120, so that request for ID confirmation 206 can only be decrypted using corresponding private key 124, which is held by server 120. Request for ID confirmation 206 is also signed with private key 104 belonging to client 108. This enables server 120 to use corresponding public key 106 to verify that client 108 signed response to ID confirmation 212.

Note that in one embodiment of the present invention, messages 202, 206 and 212 are email messages. However, note that it is sufficient for only message 206 from server 120 to client 108 to be an email message, so that server 120 can verify that the email address of client 108 is associated with public key 106.

Figure 3:
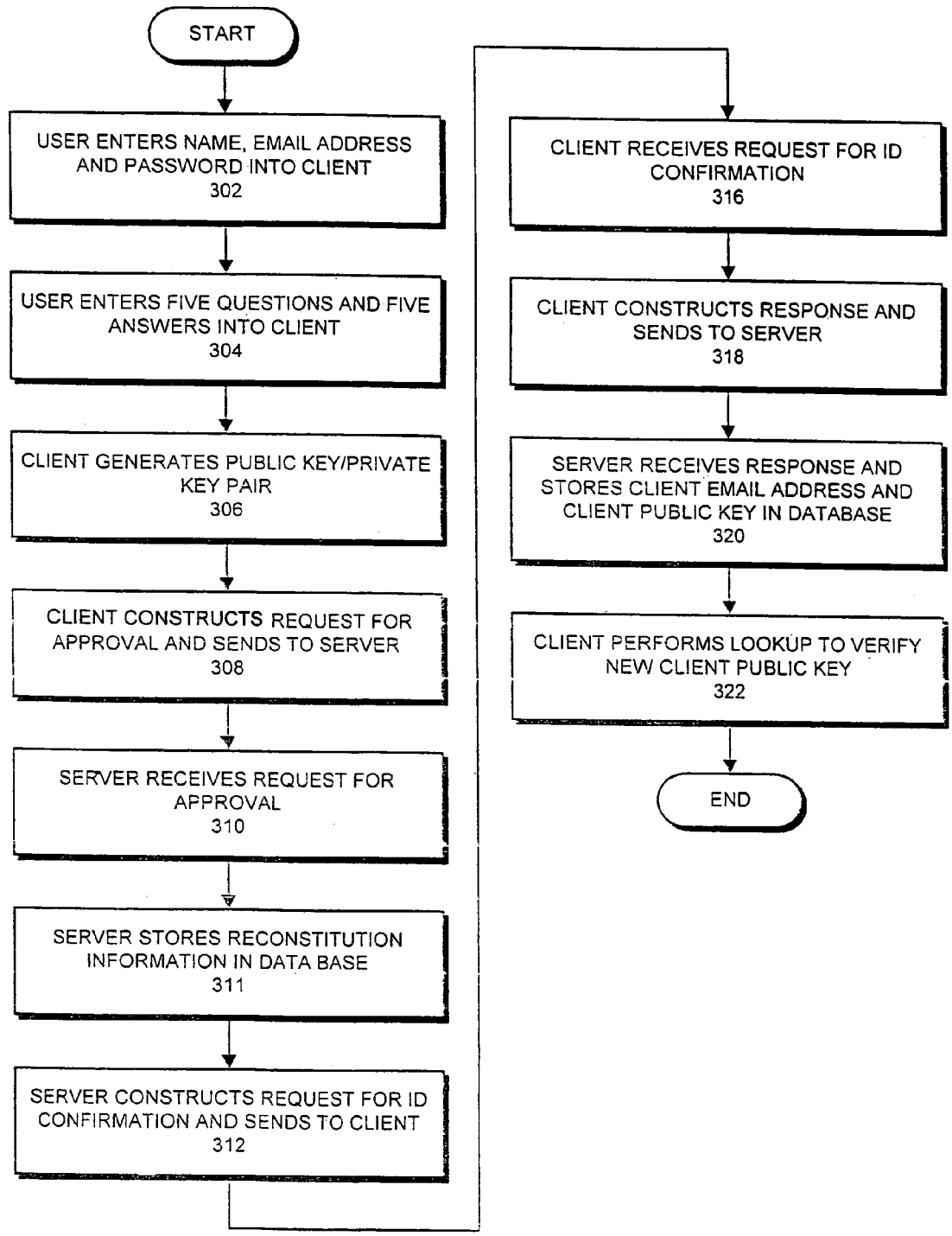
FIG. 3 is a flow chart of the key enrollment process in accordance with an embodiment of the present invention.

FIG. 3 is a flow chart of the key enrollment process in accordance with an embodiment of the present invention. User 101 first enters a name, an email address and a passphrase into client 108 (step 302). User 101 can optionally enter five questions and five responses to create key reconstitution information 204 as is discussed above with reference to FIG. 2 (step 304). Next, client 108 generates a key pair including private key 104 and public key 106 (step 306). Client 108 then constructs request for approval 202, as is described above with reference to FIG. 2, and sends request for approval 202 to server 120 (step 308).

Upon receiving request for approval 202 (step 310), server 120 decrypts request for approval 202 using server private key 124. Server 102 also uses public key 106 to verify that request for approval 202 has been signed by private key 104 held by client 108. If request for approval 202 includes key reconstitution information 204, server 120 stores key reconstitution information 204 in database 122 (step 311).

Server 120 also attempts to validate that public key 106 is associated with an email address of client 108. This is done by sending a message to the email address of client 108, and then receiving a response to the message.

More specifically, server 120 constructs request for ID confirmation 206, as is described above with reference to FIG. 2, and sends request for ID confirmation 206 to client 108 (step 312). Note that if an old public key 210 is associated with the email address of client 108 in database 122, server 120 sets existence flag 208 to TRUE, and includes old public key 210 in request for ID confirmation 206.

Upon receiving request for ID confirmation 206 (step 316), client 108 decrypts request for ID confirmation using client private key 104. Client 108 also uses public key 126 to verify that request for ID confirmation 206 has been signed by private key 124 held by server 120. Next, client 108 constructs response to ID confirmation 212, as is described above with reference to FIG. 2, and sends response to ID confirmation 212 to server 120 (step 318). Note that if client 108 would like to replace old public key 210 with new public key 106, client 108 sets replacement flag 214 within response to ID confirmation 212 to TRUE.

Upon receiving response to ID confirmation 212, server 120 decrypts response to ID confirmation using server private key 124. Server 120 also uses public key 106 to verify that response to ID confirmation 212 has been signed by private key 104 held client 108.

Next, server 120 stores an association between the email address of client 108 and client public key 106 in database 122 (step 320). In one embodiment of the present invention, storing this association involves signing client public key 106 using server private key 124, and then storing the signed client public key 106 in database 122 indexed by the email address of client 108.

Note that in one embodiment of the present invention, database 122 contains at most one public key for each email address. Furthermore, database 122 contains at most one email address for each public key.

Finally, after sending response to ID confirmation 212, client 108 periodically polls server 120 to verify that new client public key 106 has been stored in database 122 (step 322). The enrollment process for public key 106 is now complete.

Client-Initiated Key Removal Process

Figure 4:
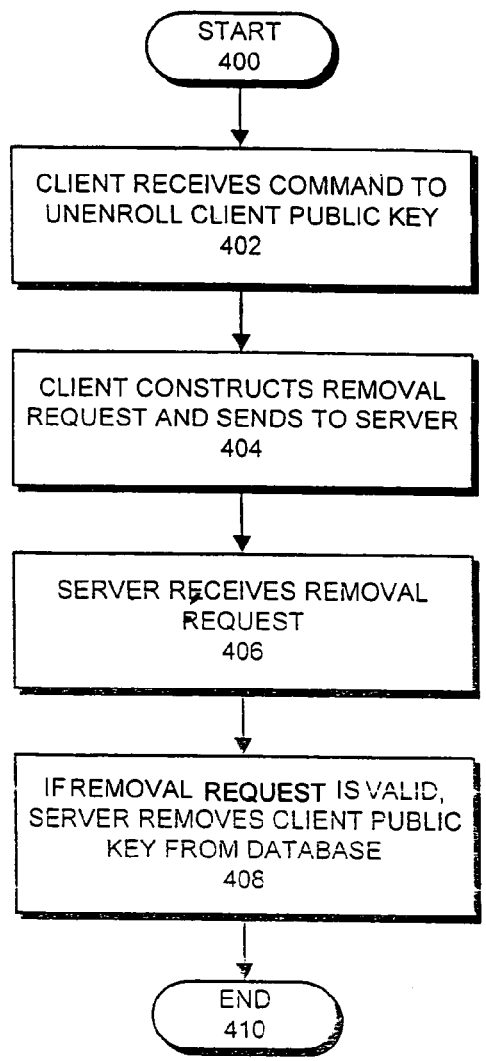
FIG. 4 is a flow chart of a client-initiated key removal process in accordance with an embodiment of the present invention.

FIG. 4 is a flow chart of a client-initiated key removal process in accordance with an embodiment of the present invention. During this process, client 108 receives a command from user 101 to unenroll client public key 106 (step 402). In response this command, client 108 constructs a removal request and sends it the server 120 (step 404). Note that constructing this removal request involves signing the removal request with private key 104 belonging to client 108.

Upon receiving the removal request (step 406), server 120 uses client public key 106 to verify that the request was validly signed with corresponding client private key 104. If the request is validly signed, server 120 removes client public key 106 from database 122.

Key Lookup Process

Figure 5:
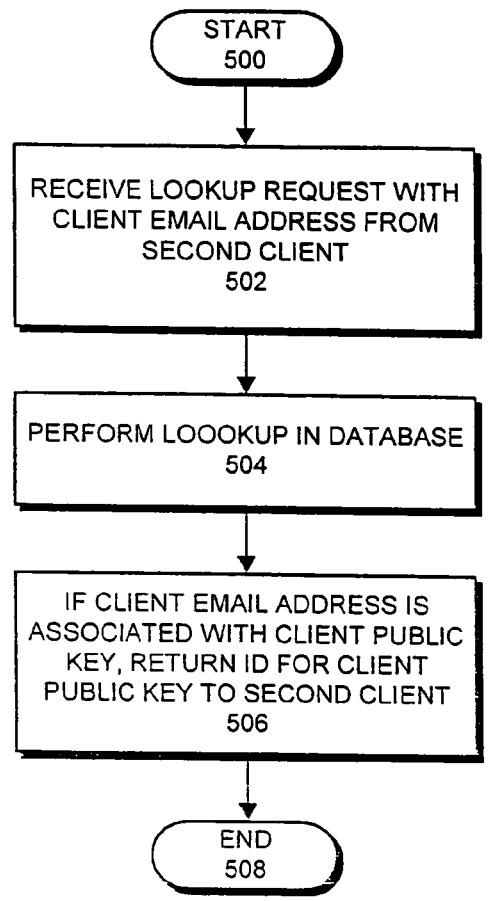
FIG. 5 is a flow chart of the key lookup process in accordance with an embodiment of the present invention.

FIG. 5 is a flow chart of the key lookup process in accordance with an embodiment of the present invention. Note that every time a client, such as client 118, sends an encrypted email message, client 118 looks up the public keys of all recipients of the email message in database 122, so that client 118 can encrypt the email message to each of the recipients. Note that an encrypted email message is typically encrypted with a randomly generated session key, and this randomly generated session key is typically encrypted with the public keys of each of the recipients to form a set of encrypted session keys. This set of encrypted session keys is sent along the with encrypted email message so that each of the recipients can decrypt the session key in order to decrypt the encrypted email message.

In order to lookup a public key, client 118 sends a lookup request including an email address to database 122. Upon receiving the lookup request (step 502), database 122 decrypts and verifies the lookup request if necessary, and then performs a lookup using the email address (step 504). If the email address is associated with a public key 106 in database 122, database 122 returns an identifier for public key 106 (possibly signed and encrypted) to client 118 (step 506). This identifier may be a hash (message digest) created from public key 106. Note that sending the identifier can be easier than sending the public key, because this identifier is smaller than the public key. However, note that if client 118 does not possess a local copy of public key 106, database 122 eventually sends public key 106 to client 118.

Also note that in one embodiment of the present invention, communications between client 118 and database 122 involve fast LDAP communications instead of slower email messages. This makes it practical to perform lookups each time an encrypted email message is sent.

In one embodiment of the present invention, in order to reduce the number of lookups, the system does not perform lookups into database 122 every time an encrypted email message is sent, but instead uses locally stored public keys for the message recipients. These locally stored public keys are periodically updated by performing lookups into database 122.

Server-Initiated Key Removal Process

Figure 6:
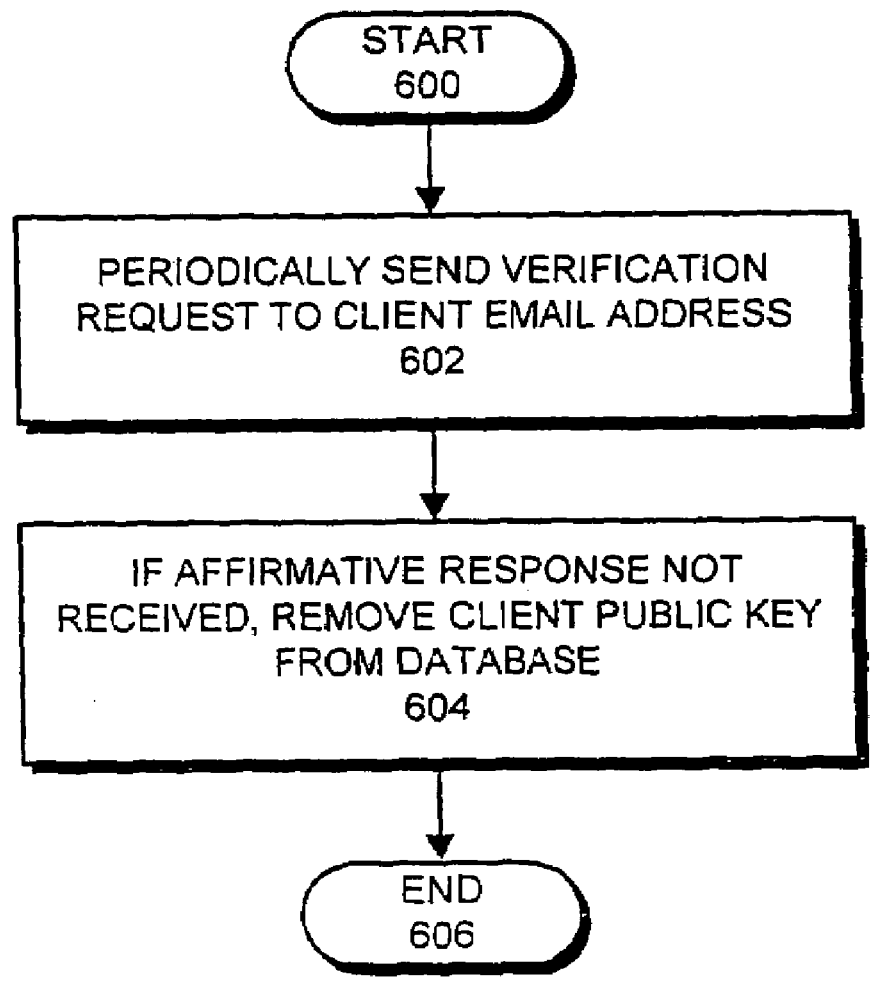
FIG. 6 is a flow chart of a server-initiated key removal process in accordance with an embodiment of the present invention.

FIG. 6 is a flow chart of a server-initiated key removal process in accordance with an embodiment of the present invention. In this embodiment, server 120, periodically verifies that each public key within database 122 remains valid. If a given key is not valid, it is removed from database 122.

More specifically, for each public key stored in database 122, server 102 sends a verification request to the associated email address (step 602). This verification request includes the client public key 106, and is possibly encrypted and signed by server 120.

If an affirmative response is not received to the verification request, server 120 removes client public key 106 from database 122 (step 604).

For example, each client public key can be verified once every six months, and the verification request can be resent to client 108 every week for a month before removing public key 106 from database 122 for lack of response.

Note that the above-described process removes public keys belonging to users who lose access the their email account, or users who die. Moreover, the above-described process solves the problem of users not being able to remove their public keys if they forget their password.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing public keys through a server that stores associations between public keys and email addresses, comprising:

receiving a first message from a client at the server, the first message containing a request for approval of a client public key along with a client public key;

sending a second message from the server to the client, the second message containing a request for identity confirmation that includes the client public key; and if a third message is received from the client at the server containing an affirmative response to the request for identity confirmation, storing an association between a client email address and the client public key in a database, so that other clients can look up the client public key in the database;

wherein, prior to sending the second message, the method further comprises determining if the database already contains a prior client public key associated with the client email address, if the database already contains the prior client public key, including the prior client public key in the request for identity confirmation sent to the client in the second message, so that the client can indicate that the server should replace the prior client public key with the client public key.

2. The method of claim 1, further comprising:

receiving a communication from a second client at the server, the communication including the client email address;

performing a lookup in the database based on the client email address to determine if the if the lookup indicates that the client email address is associated with the client public key, sending a key identifier for the client public key from the server to the client, wherein the key identifier allows the client to determine whether the client possesses the client public key.

3. The method of claim 1,
wherein the request for approval includes key reconstitution information that allows the client to decrypt to an encrypted client private key at the client if the client forgets a passphrase for decrypting the encrypted client private key; and
wherein the method further comprises storing the key reconstitution information in the database.

4. The method of claim 1, further comprising:
decrypting the request for approval at the server using a server private key, the request for approval having been encrypted with a corresponding server public key by the client; and
using the client public key to verify that the request for approval is signed by a corresponding client private key.

5. The method of claim 1, further comprising:
receiving a request at the server to remove the client public key from the database;
if the request is signed with a corresponding client private key, removing the client public key from the database.

6. The method of claim 1, wherein the database contains at most one key for each email address.

7. The method of claim 1, wherein the database contains at most one email address for each key.

8. The method of claim 1, further comprising:
periodically sending a verification request from the server to the client email address asking if the client public key remains valid; and
if an affirmative response to the verification request is not received, removing the client public key from the database.

9. A computer-readable storage medium storing instructions that when executed by a computer cause the computer to perform a method for managing public keys through a server that stores associations between public keys and email addresses, the method comprising:
receiving a first message from a client at the server, the first message containing a request for approval of a client public key along with a client public key;
sending a second message from the server to the client, the second message containing a request for identity confirmation that includes the client public key; and
if a third message is received from the client at the server containing an affirmative response to the request for identity confirmation, storing an association between a client email address and the client public key in a database, so that other clients can look up the client public key in the database;
wherein, prior to sending the second message, the method further comprises determining if the database already contains a prior client public key associated with the client email address, if the database already contains the prior client public key, including the prior client public key in the request for identity confirmation sent to the client in the second message, so that the client can indicate that the server should replace the prior client public key with the client public key.

10. The computer-readable medium of claim 9, wherein the method further comprises
receiving a communication from a second client at the server, the communication including the client email address;
performing a lookup in the database based on the client email address to determine if the client email address is associated with the client public key;
if the lookup indicates that the client email address is associated with the client public key, sending a key identifier for the client public key from the server to the client, wherein the key identifier allows the client to determine whether the client possesses the client public key.

11. The computer-readable storage medium of claim 9,
wherein the request for approval includes key reconstitution information that allows the client to decrypt to an encrypted client private key at the client if the client forgets a passphrase for decrypting the encrypted client private key; and
wherein the method further comprises storing the key reconstitution information in the database.

12. The computer-readable storage medium of claim 9, wherein the method further comprises:
decrypting the request for approval at the server using a server private key, the request for approval having been encrypted with a corresponding server public key by the client; and
using the client public key to verify that the request for approval is signed by a corresponding client private key.

13. The computer-readable storage medium of claim 9, wherein the method further comprises:
receiving a request at the server to remove the client public key from the database;
if the request is signed with a corresponding client private key, removing the client public key from the database.

14. The computer-readable storage medium of claim 9, wherein the database contains at most one key for each email address.

15. The computer-readable storage medium of claim 9, wherein the database contains at most one email address for each key.

16. The computer-readable storage medium of claim 9, wherein the method further comprises:
periodically sending a verification request from the server to the client email address asking if the client public key remains valid; and
if an affirmative response to the verification request is not received, removing the client public key from the database.

17. An apparatus that facilitates managing public keys through a server that stores associations between public keys and email addresses, the apparatus comprising:
a receiving mechanism at the server that is configured to receive a first message from a client, the first message containing a request for approval of a client public key along with the client public key;
a sending mechanism that is configured to send a second message to the client, the second message containing a request for identity confirmation that includes the client public key;
a database located at the server;
a storing mechanism coupled to the database, wherein if the receiving mechanism receives a third message from the client containing an affirmative response to the request for identity confirmation, the storing mechanism is configured to store an association between a client email address and the client public key in a database, so that other clients can look up the client public key in the database; and
a lookup mechanism that is configured to determine if the database already contains a prior client public key associated with the client email address;

wherein if the database already contains the prior client public key, the sending mechanism is additionally configured to include the prior client public key in the request for identity confirmation sent to the client, so that the client can indicate that the server should replace the prior client public key with the client public key.

18. The apparatus of claim 17, further comprising a key lookup mechanism that is configured to:
receive a communication from a second client at the server, the communication including the client email address;
perform a lookup in the database based on the client email address to determine if the client email address is associated with the client public key; and to
send a key identifier for the client public key from the server to the client, if the lookup indicates that the client email address is associated with the client public key, wherein the key identifier allows the client to determine whether the client possesses the client public key.

19. The apparatus of claim 17,
wherein the request for approval includes key reconstitution information that allows the client to decrypt to an encrypted client private key at the client if the client forgets a passphrase for decrypting the encrypted client private key; and
wherein the storing mechanism is additionally configured to store the key reconstitution information in the database.

20. The apparatus of claim 17, further comprising:
a decryption mechanism that is configured to decrypt the request for approval at the server using a server private key, the request for approval having been encrypted with a corresponding server public key by the client; and
a verification mechanism that is configured to use the client public key to verify that the request for approval is signed by a corresponding client private key.

21. The apparatus of claim 17, further comprising a key removal mechanism that is configured to:
receive a request at the server to remove the client public key from the database; and to
remove the client public key from the database, if the request is signed with a corresponding client private key.

22. The apparatus of claim 17, wherein the database contains at most one key for each email address.

23. The apparatus of claim 17, wherein the database contains at most one email address for each key.

24. The apparatus of claim 17, further comprising a key removal mechanism that is configured to:
send a verification request from the server to the client email address asking if the client public key remains valid; and to
remove the client public key from the database, if an affirmative response to the verification request is not received.

* * * * *